United States Patent Office

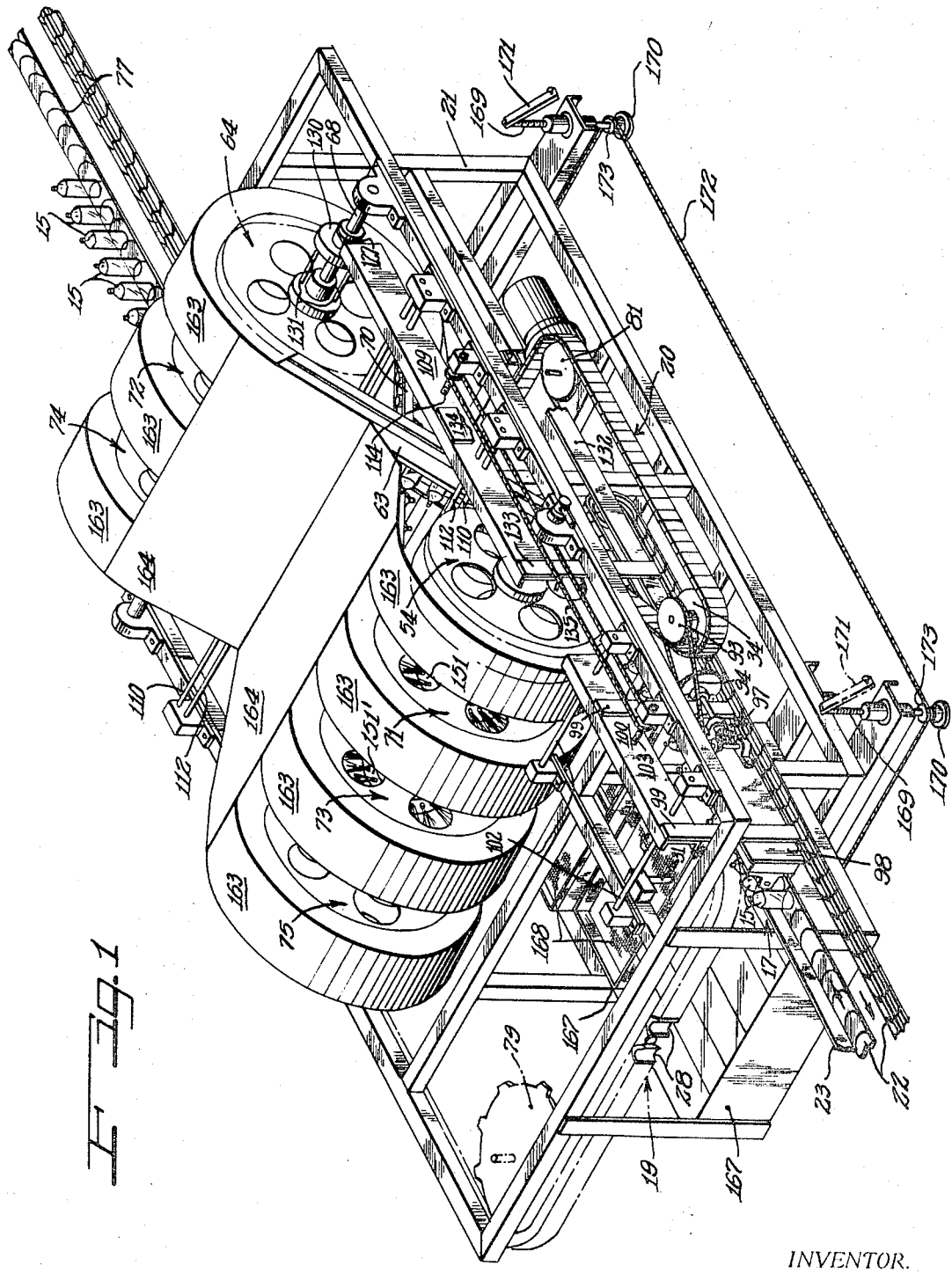

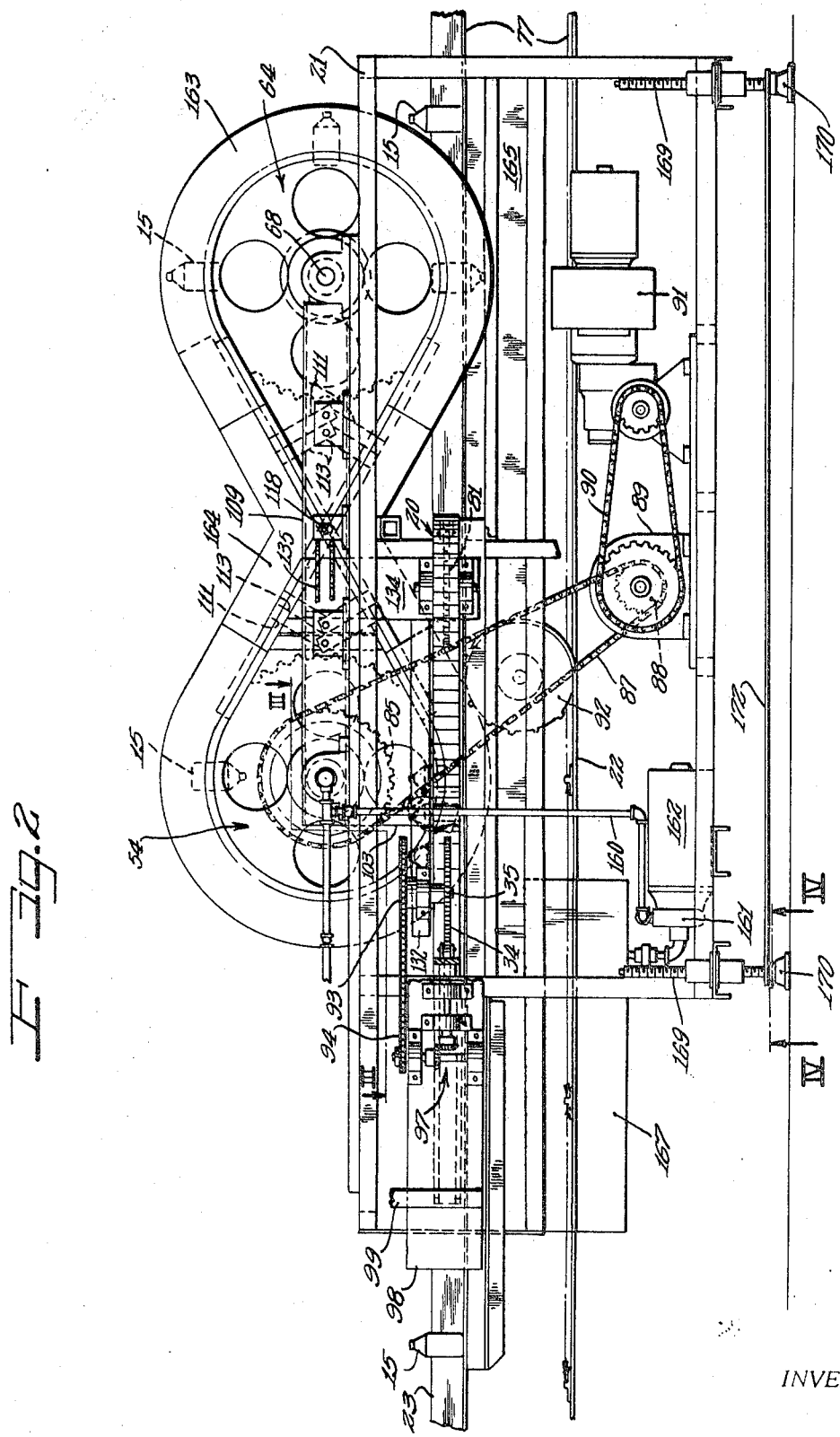

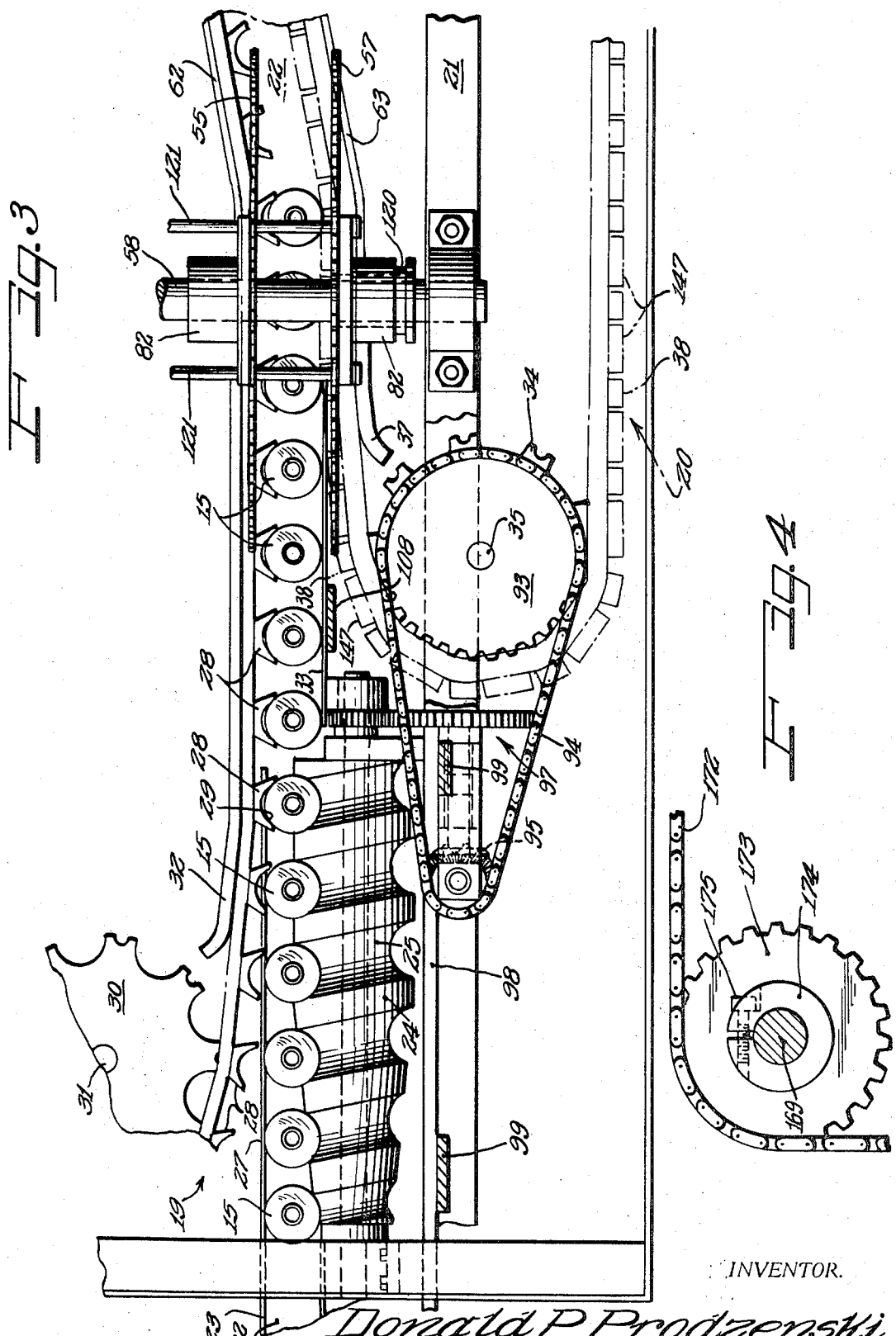

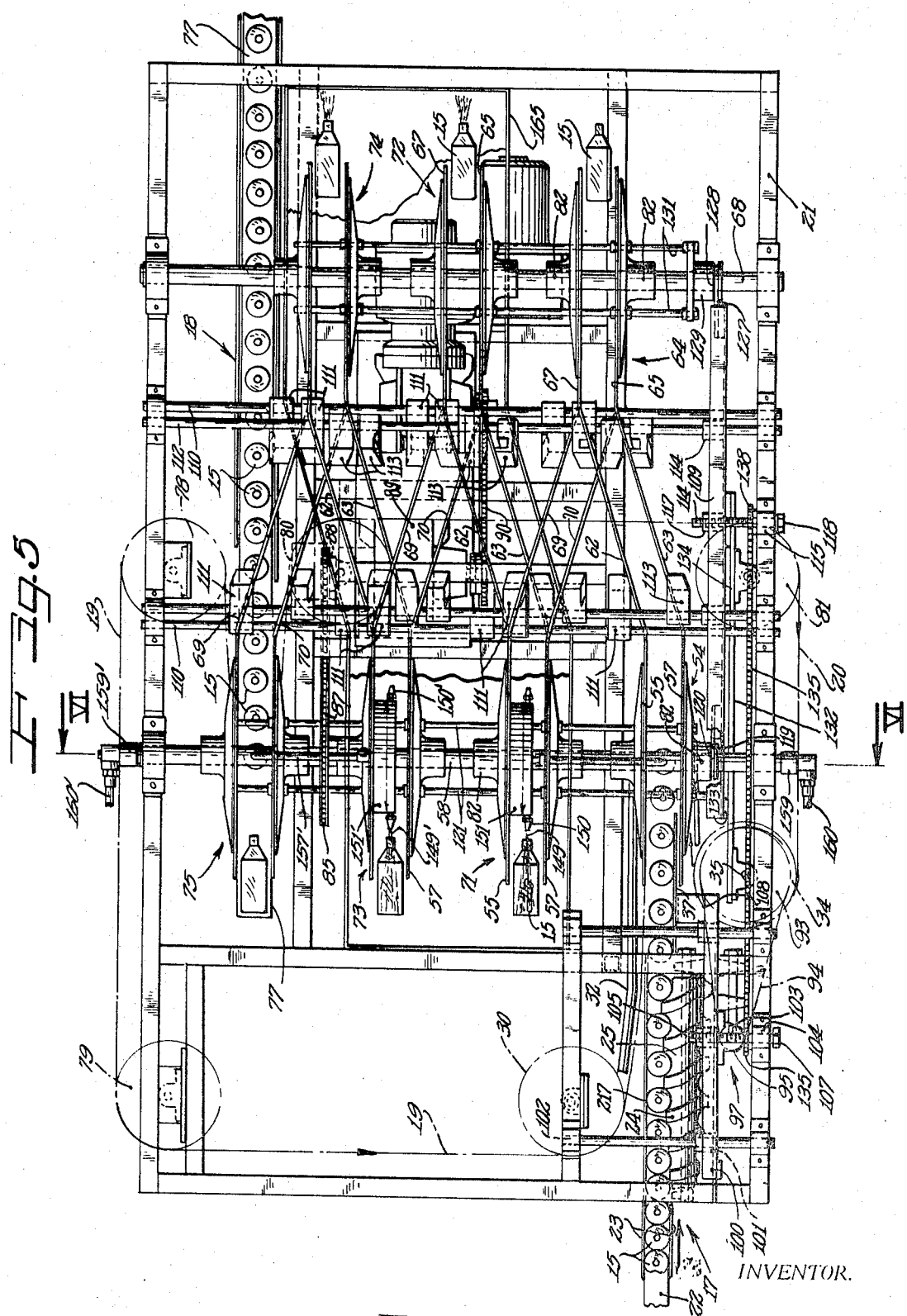

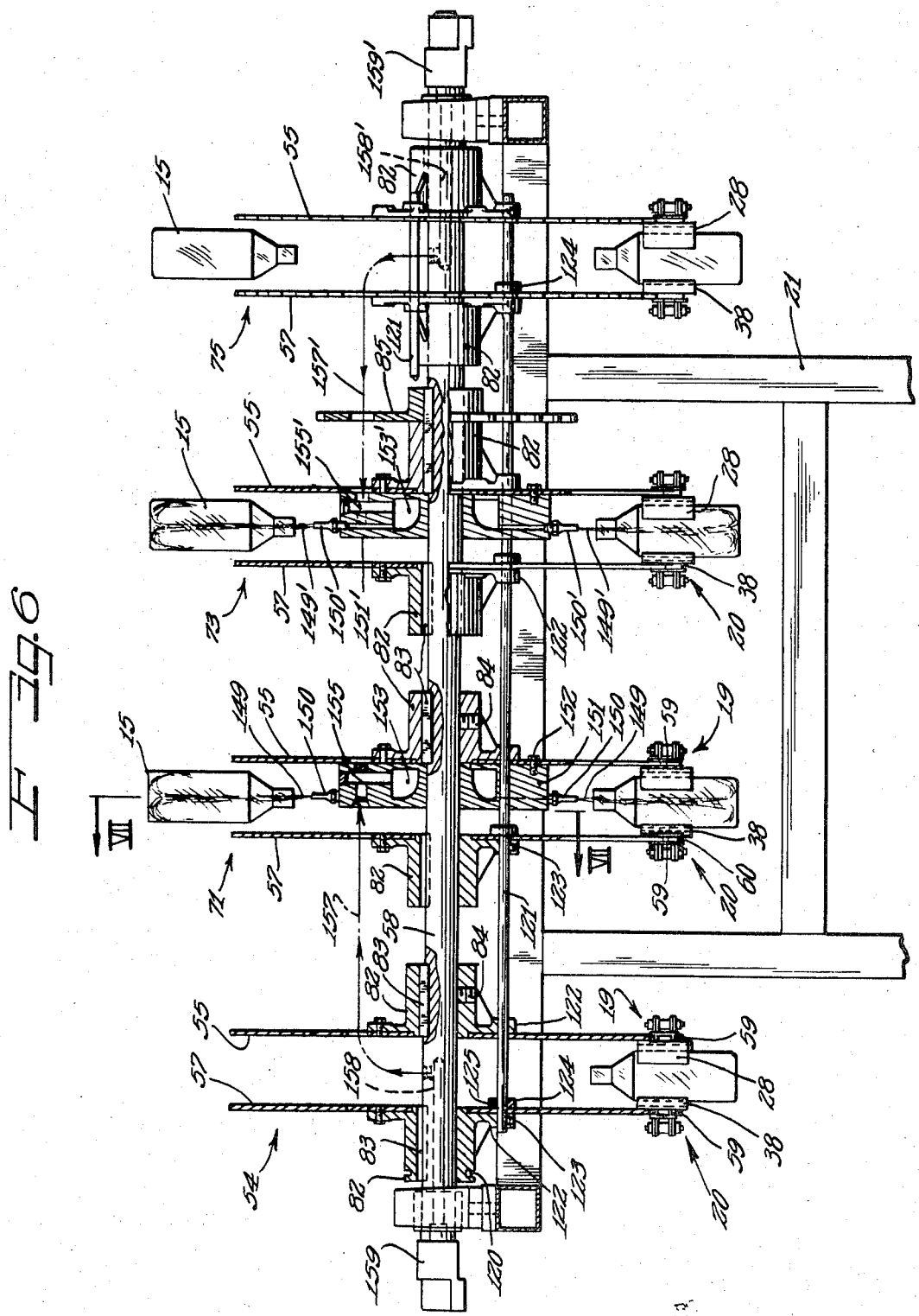

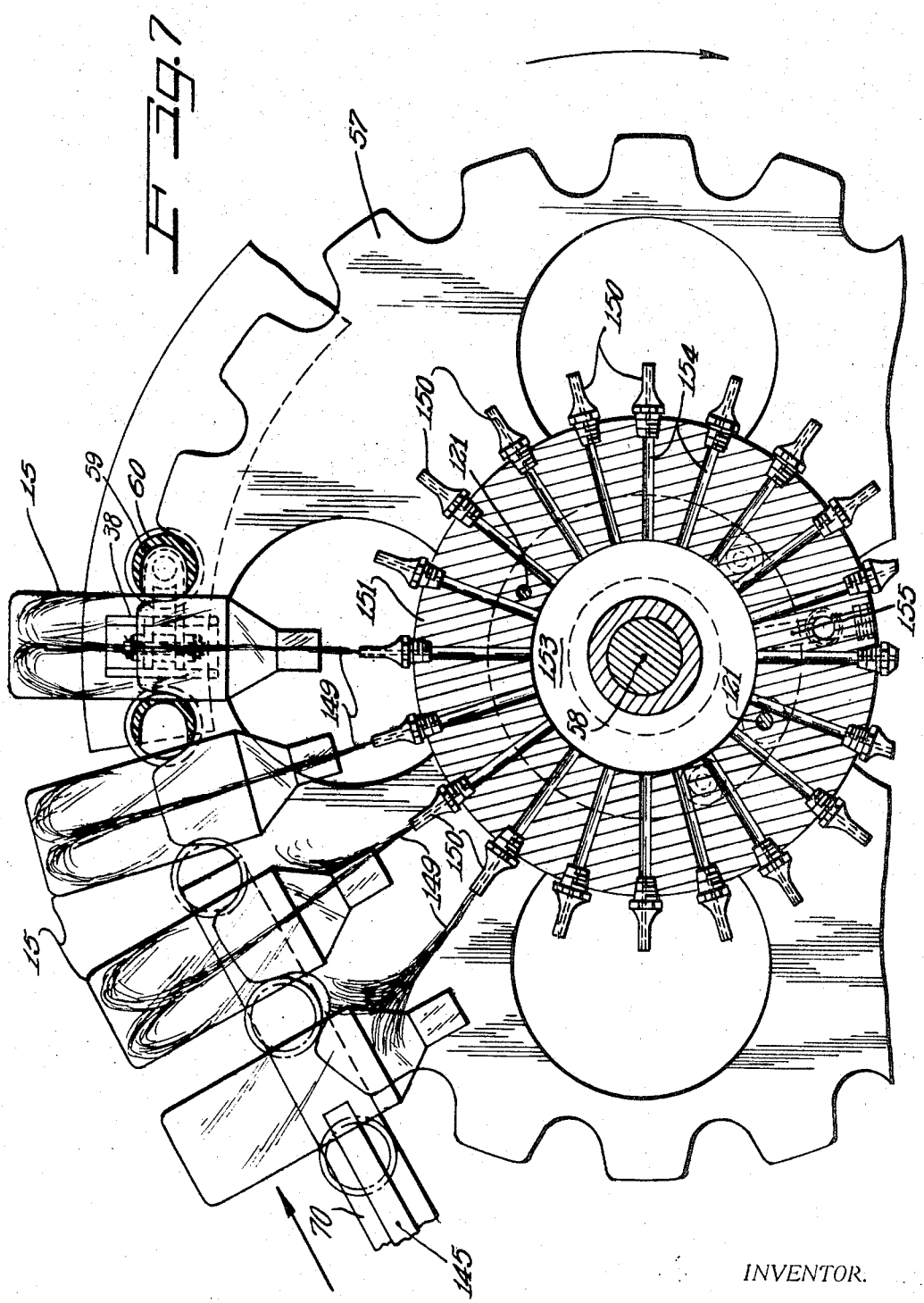

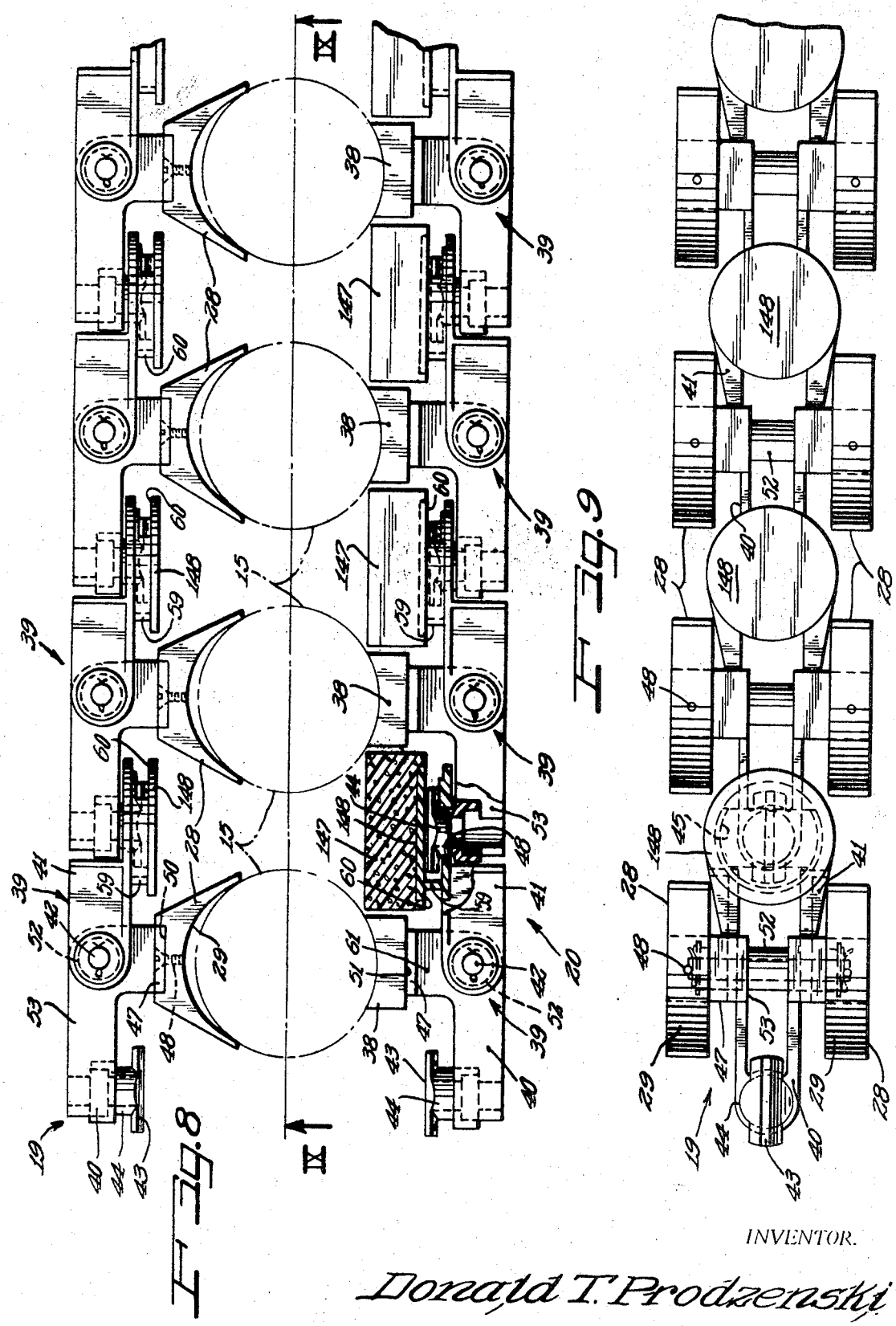

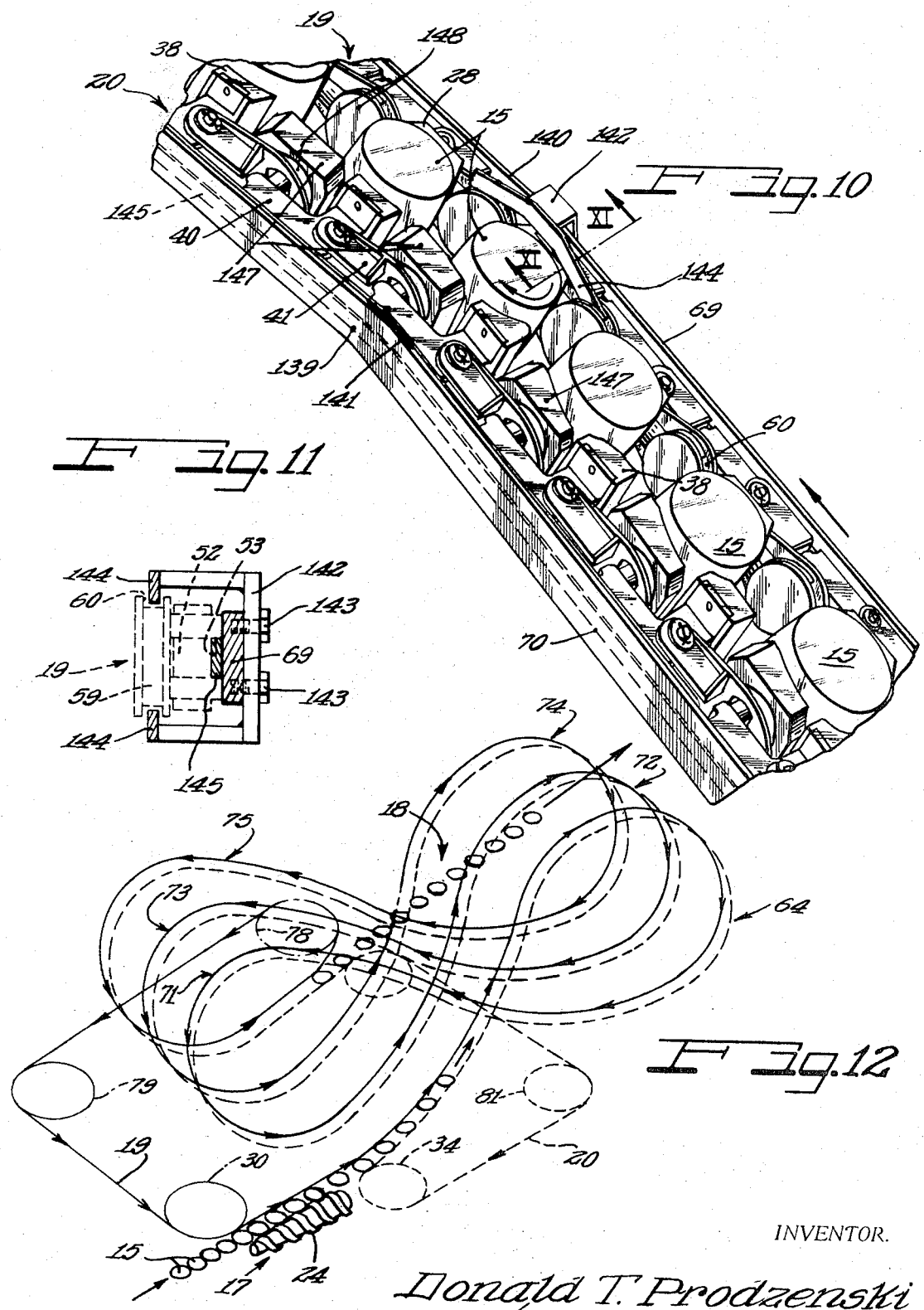

3,556,847
Patented Jan. 19, 1971

1

3,556,847
METHOD OF AND APPARATUS FOR CLEANING BOTTLE AND JAR TYPE CONTAINERS
Donald T. Prodzenski, Glen Ellyn, Ill., assignor to Alpeda Industries, Inc., Franklin Park, Ill., a corporation of Illinois
Filed Jan. 23, 1968, Ser. No. 699,850
Int. Cl. B08b 9/00
U.S. Cl. 134—23                                28 Claims

ABSTRACT OF THE DISCLOSURE

Open end containers are fed to and transported continuously from infeed to discharge seriatim by and between synchronized articulated sections of confronting endless gripping conveyors along a path having one or more generally figure-eight convolutions and during which cleansing is effected. In a compact, unitary, portable machine, the apparatus includes a timing infeed screw, two banks of relatively offset conveyor guiding and driving wheels, crossover conveyor track means, and cleaning fluid jet stream means operative while the containers are supported open end inward while traveling about certain of the wheels. Spinout is effected as the containers are traveling open end out about others of the wheels.

---

This invention relates to a method of and apparatus for cleaning bottle and jar type containers, and is more particularly concerned with the continuous high speed preparation of new containers of this type to meet accepted and required standards of cleanliness before filling.

As delivered to a processing or filling plant, and while in storage awaiting use, the containers may have various incidental debris and dust lodged therein and thereon, such as small particles of the container material, small pieces of the packing material, and the like. Especially for consumer goods such as food products, beverages, pharmaceuticals, and the like it is necessary to clean the containers inside and desirably outside, by at least ejection of any material within the containers, and often for hygienic reasons, frequently to meet the standards of sanitary codes, washing and sometimes chemical treatment or sterilization are required. Whereas container filling equipment may operate at high speeds, automation to attain commensurate speeds in cleaning the containers has generally lagged. Further, prior arrangements for cleaning containers have generally required unduly large space and proliferation of equipment in the accomplishment of the sometimes several cleaning steps required such as ejecting loose material, blowing or washing out the interiors, washing the exteriors, chemical treatment followed by rinsing, and the like.

An important object of the present invention, therefore, is to effect high speed, continuous, mass production cleaning of containers in minimum space and with minimum equipment.

Another object of the invention is to provide a new and improved method of and apparatus for cleaning containers in multiple cleaning steps, continuously, and involving a plurality of inversions of the containers.

A further object of the invention is to provide a new method of and apparatus for cleaning containers and involving transporting the containers in a generally figure-eight path.

Still another object of the invention is to provide a new and improved compact, high speed, large capacity container cleaning machine.

Yet another object of the invention is to provide a new and improved container cleaning machine of unitary, self-contained construction.

2

A still further object of the invention is to provide new and improved leveling means in a portable container cleaning machine.

It is also an object of the invention to provide a new and improved articulated conveyor construction for transporting containers through a cleaning machine.

Other objects, features, and advantages of the present invention will be readily apparent from the following detailed description of a preferred embodiment thereof taken in conjunction with the accompanying drawings in which:

FIG. 1 is an isometric view of a container cleaning machine according to principles of the invention.

FIG. 2 is a side elevational view of the machine.

FIG. 3 is an enlarged fragmentary plan detail view taken substantially along the line III—III of FIG. 2.

FIG. 4 is an enlarged fragmentary sectional detail view taken substantially along the line IV—IV of FIG. 2.

FIG. 5 is a schematic top plan view of the machine.

FIG. 6 is an enlarged fragmentary, generally schematic vertical sectional detail view taken substantially along the line VI—VI of FIG. 5.

FIG. 7 is an enlarged fragmentary vertical sectional, elevational detail view taken substantially along the line VII—VII of FIG. 6.

FIG. 8 is a fragmentary plan view of the articulated container transporting conveyors.

FIG. 9 is an elevational view of one of the conveyors taken substantially in the plane of line IX—IX of FIG. 8.

FIG. 10 is an isometric view of a portion of one of the cross-over guide tracks for the articulated container transporting conveyors.

FIG. 11 is an enlarged fragmentary sectional detail view taken substantially along the line XI—XI of FIG. 10; and FIG. 12 is a schematic flow diagram.

On reference to FIGS. 1, 5 and 12 it will be observed that according to the principles of the present invention containers 15 of the bottle or jar type having closed bottoms and open ends, and herein shown as necked bottles, are transported seriatim in a path involving figure-eight convolutions, between an infeed station 17 and a discharge station 18. Transporting of the containers 15 throughout the path through the machine is effected by and between synchronized confronting endless articulated section conveyors 19 and 20. In the course of traveling the figure-eight configuration, the containers are moved through at least one loop with their open ends outward for centrifugal ejection of any contained material, and are moved through at least one other loop with their open ends inward and during which they may be subjected to fluid cleanout by jet streams directed thereinto. Where desirable a plurality of outward loop movements and inward loop movements may be effected for multiple treatment for cleaning purposes between the inlet and outlet stations. Preferably, the container cleaning machine is constructed as a self-contained, portable unit comprising a suitable rigid frame 21 upon which all of the working parts are mounted, with the infeed station 17 located at one end and adjacent to one side of the frame and the discharge station 18 located at the opposite end and along the opposite side of the frame.

At the infeed station 17, the containers 15 to be cleaned are delivered as a preferably continuous procession from the supply source on and by way of suitable means such as an endless conveyor 22, crowding in between lead-in guide bars 23. In order to attain a proper spaced sequence and timing of the containers with respect to the confronting transporting conveyors 19 and 20, the containers are engaged by means for this purpose comprising a helical feed screw 24 (FIGS. 4 and 5) which has on its perimeter a gradually expanding feed groove 25 in which one side of each of the upright containers is engaged, with the opposite side sliding along a guide bar 27. Rotation of the feed screw 25 advances each of the containers inwardly through the feedin station and in the course of such advance gradually separates each succeeding container from the one behind to a predetermined spacing and at a speed synchronized with the cleaning path transporting conveyors. For this purpose, the feed screw 24 is of a tapered construction progressively increasing in diameter from its rear entry end toward its opposite end throughout a limited entry end portion, and the container-advancing helical groove has a pitch which in the tapered portion gradually increases for thereby effecting a progressive advancing separation of each successive container to an inner end section of the screw which is of generally cylindrical form and has the groove 25 of a spacing pitch which is synchronized with the spacing of container-gripping means on the confronting conveyors 19 and 20 to which the screw feeds the containers. Desirably, the feed screw 24 is made from a material which affords minimum friction in engagement with the containers and which is reasonably shockproof, especially where the containers 15 are of glass, to avoid breakage. A suitable material for the purpose comprises an acetal resin which is available under the trade name Delrin, or a suitable nylon formulation.

While still within the last portion of the feed screw groove 25, and just before it is discharged from the groove at the inner end of the feed screw 24, each of the containers 15 is synchronized with and engaged by the transporting conveyor 19. For this purpose, the conveyor 19 has a continuous equally spaced series of self-contained container-engaging members 28 which are constructed and arranged in substantially cradle-shape with respective pocket recesses 29 within which a substantial portion of the perimeter of the container is received and transportably gripped for positive advance and travel with the conveyor. Each of the gripping cradle members 28 merges into container-engaging relation, as carried by the conveyor 19, trained over and guided by a suitable sprocket wheel 30 rotatably mounted on the frame 21 on a shaft 31. As the articulated conveyor 19 leaves the sprocket wheel 30 relatively spaced with respect to the feed screw 24, a guide bar 32 completes the convergence of the conveyor to effect engagement by the successive gripping cradles 28 with the successive containers 15.

As each of the containers 15 leaves the discharge end of the feed screw 24, under the control of one of the gripping cradles 28, a guide bar 33 in confronting spaced relation to the conveyor 19 maintains registration of the containers with the respective cradle members 28 as the containers are advanced toward engagement by the articulated endless conveyor 20 which for this purpose is trained over a suitable sprocket wheel 24 mounted rotatably on a vertical shaft 35 on the frame 21. From the sprocket wheel 34 the conveyor 20 is guided by a bar 37 into converging relation with the succession of containers 15 moving along under the driving impetus of the conveyor 19. Each of the containers 15 is then squeeze gripped by a respective one of a continuous series of frictional resilient gripping pads 38 desirably constructed of a sponge elastomer such as polyurethane and thrusting against the engaged container with sufficient pressure to substantially cradle the engaged perimeter of the container complementary to the associated gripping cradle 28 of the conveyor 19 and over a sufficient extent of the perimeter of the container to hold the container against slipping longitudinally from the clamping grip of the pad.

In a highly desirable construction, the articulated sectional conveyors 19 and 20 embody features of structure covered in U.S. Pat. 3,317,030 issued May 2, 1967. For convenience and standardization of structure both of the conveyors 19 and 20 may be of substantially the same basic structure, with the only material difference being in the means on the two conveyors for engaging the containers 15. On reference to FIGS. 8 and 9 the structural details of the conveyors 19 and 20 will be more clearly evident. In respect to each of the conveyors, it comprises an endless link chain arrangement of sections 39, each of which comprises a pair of members 40 and 41 pivotally connected together in articulated relation by a pin 42. While the pin connection enables the link section to pivot freely about one axis normal to the longitudinal axis of the link, means for connecting the link sections together in the chain relationship enable pivoting of the links relative to one another on a second axis which is normal to both the longitudinal and the first transverse axis, and also to pivot to a substantial extent about the longitudinal axis of the chain. For this purpose, the construction and relationship of the connections of the sections one to another is in accordance with Pat. No. 3,317,030 and which to the extent necessary for a full understanding of the disclosure herein is incorporated by reference. For this purpose, the member 40 has on its free end portion a longitudinally elongated coupling head 43 on a swivel trunnion 44 which engages in a coupling socket 45 provided in the free end portion of the member 41. Within the socket 45, the head 43 maintains a coupled relationship of minimum tolerances but nevertheless free swiveling coaction on an axis normal to the longitudinal axis of the chain and also substantial pivotal relative movement on an axis parallel to the longitudinal axis of the chain.

For supporting the bottle-engaging cradle members 28 and the opposed gripping pads 38, the conveyor chain section members 40 are provided with respective supporting means desirably comprising, on each member, a pair of laterally oppositely extending coplanar, aligned flanges lying in a plane parallel to the longitudinal axis of the member and carried on the pivoted end portion of the member in spaced relation to the adjacent pivotally attached portion of the joined link section member 41. Although the saddle members 28 may, if preferred, comprise one-piece rigid or semi-rigid members of sufficient length to engage upon both of the supporting flanges 47, a desirable, lightweight and economical arrangement comprises having the members 28 formed as separate limited length blocks, each separately secured to its flange 47, as by means of a screw 48. A single screw is sufficient since the cradle blocks 28 are retained against turning out of their aligned spaced relationship by reception of the flanges 47 and the parallel edges thereof within respective complementary socket grooves 50 provided for this purpose in the base portions of the respective cradle members. On the conveyor 20, the flanges 47 support the gripping pads 28 which are desirably formed in one piece so as to extend continuously between the flanges 47 and which are desirably provided with respective base seating socket 51 in which the flanges 47 are engaged, with suitable adhesive means bonding the pads 38 to the supporting flanges.

To enable efficient engagement thereof by the recessed cogs of the cogwheels 30 and 34 as well as others, each of the conveyor chain members 40 provides about its connecting pin pivot journal a cog hub 52 (FIG. 8). In addition, the conveyor section members 40 and 41 provide along the backs of the hubs 52 and longitudinally therealong a continuous back-opening track groove 53 within which guide bars such as the bars 32 and 37 are slidably received for supporting the chain against lateral sagging where it is not otherwise supported.

After leaving the infeed station 17 in the grip of the articulated chain conveyors 19 and 20, the containers 15 are carried by the conveyors through a treatment path wherein the containers travel one or more figure-eight configurations, with their open ends outward in one loop of the configuration and with their open ends inward in the second loop of the configuration. To this end, the conveyors 19 and 20 are guided by the bars 32 and 37 to a driving sprocket assembly 54 which comprises a pair of spaced coextensive substantially identical sprocket wheels 55 and 57 mounted corotational with a driven rotary shaft 58 mounted on a horizontal axis on and across the supporting frame 21. The spacing between the sprocket wheels 55 and 57 matches the spacing between the conveyors 19 and 20 and is sufficient to receive the containers 15 freely between the sprocket wheels. Further, the diameter of the sprocket wheels 55 and 57 is sufficient to afford ample clearance between the ends of the containers and any operating structure on or about the supporting shaft 58 and concerned with the sprocket wheels. From the guide bars 32 and 37, the conveyors 19 and 20 join the lowest portions of the sprocket perimeters of the wheels 55 and 57, respectively, which are synchronized to receive between the sprockets thereof sprocket hubs 59 (FIGS. 6 and 8) provided on the conveyor chain section members 41 about the respective coupling sockets 45 thereof and within an annular groove 60 in each instance of a width to receive the sprocket wheel in free but reasonably close relation to maintain tolerance looseness to a minimum. Entirely free sprocket wheel perimeter clearance between the flanges 47 and the adjacent pivotally pinned portion of the associated member 41 is afforded by an ample clearance gap 61.

From the sprocket wheel assembly 54, the conveyors 19 and 20 are guided by respective parallel spaced crossover bars 62 and 63, obliquely upwardly and tangentially to the top portions of the perimeters of an idler sprocket assembly 64 comprising spaced coextensive aligned sprocket wheels 65 and 67, respectively, corotationally mounted upon an idler shaft 68 carried in horizontal relation on and across the frame 21 in suitably spaced parallel relation to the driven shaft 58. On the sprocket assembly 64 the containers 15 are carried with their open ends directed outwardly and as the containers are carried around and under by the sprocket assembly 64 at substantial speed, foreign material is centrifugally ejected. From the bottom of the sprocket assembly 64, the conveyors 19 and 20 are guided by crossover track bars 69 and 70, respectively, obliquely upwardly to meet and engage tangentially with a second driven sprocket wheel assembly 71 having its sprocket wheels 55 and 57 corotative with the shaft 58 suitably spaced axially from the first sprocket wheel assembly 54. On the sprocket wheel assembly 71, the containers 15 are carried with their open ends inwardly. If now treatment of the containers has been completed, the containers may be delivered by the transporting conveyors 19 and 20 to the discharge station. However, in the system as disclosed, the containers are carried through a plurality of treatment figure-eight convolutions before discharge from the machine and therefore the conveyors are guided by another set of the crossover track bars 62, 63 onto a second sprocket wheel assembly 72 having its sprocket wheels 65 and 67 corotative on the idler shaft 68 and from which the transport conveyors are guided by a further set of the track bars 69 and 70 to the top of a third driven sprocket wheel assembly 73. From the lower perimeter of the sprocket wheel assembly 73 the transport conveyors are guided by a further set of upwardly inclined crossover track bars 62, 63 to the top of a third idler sprocket assembly 74 on the idler shaft 68. Then the transport conveyors are guided by a final set of the upwardly inclined crossover track bars 69, 70 to the top of a final driven sprocket wheel assembly 75. As will be observed in the efficient, compact arrangement depicted, the sprocket wheel assemblies on the driven shaft 58 and on the idler shaft 68 are relatively offset from one another in the progression of the conveyors in a uniformly staggered relationship in which the sets of crossover track bars 62, 63 and 69, 70, respectively, are all substantially identical, affording desirable structural standardization, uniform length of travel between sprocket assemblies, uniform conveyor chain tension, and thus freedom from unusual strains or wearing action or reaction throughout the continuous conveyor chain circuits.

On leaving the final sprocket wheel assembly 75, the transporting conveyor chains 19 and 20 release the cleaned containers 15 open end up onto a discharge conveyor 77 aligned with the sprocket wheel assembly 75 and arranged to transport the containers from the machine. As the transport conveyors release the containers for discharge, the conveyor chain 19 runs over a cog wheel 78 and into a return run which carries it toward the infeed station 17 over another return run cog wheel 79 and thence to the infeed station cogwheel 30 for repetition of the cycle of container transport through the multiple figure-eight cleaning path. Similarly, the endless transport conveyor chain 20 moves into container discharge relation away from the conveyor 19 over a return cogwheel 80 and thence transversely under the crossover tracks to a further return cogwheel 81 from which it extends to and runs over the infeed station cogwheel 34 for repetition of the cycle of container transport through the treating cycle.

For standardization of parts and economy in manufacture, the driven sprocket wheel assemblies mounted on the shaft 58, and the idler sprocket wheel assemblies mounted on the idler shaft 68 are desirably substantially identical so that the description of the corotative mounting of the sprocket assemblies on one of the shafts will suffice for an understanding of the corotative mounting of the sprocket assemblies on the other of the shafts, and reference is therefore made to FIG. 6 which shows in some detail mounting of the sprocket assemblies carried by the shaft 58. Each of the sprocket wheels 55 and 57 has a hub 82 which is slidably engaged on the shaft 58 and a key 83 maintains the hub corotative with the shaft. The hub 82 of each of the sprocket wheels 55 is locked to the shaft against axial displacement, as by means of a setscrew 84. Each of the sprocket wheels 65 and 67 also has a hub 82 which is slidably received on the shaft 68, and keyed thereto for corotation. The hubs 82 of the sprocket wheels 67 are locked to the shaft 68 against axial displacement, as for example in the same manner as the hubs of the sprocket wheels 55 are locked by the setscrews 84.

The driving of the shaft 58 may be effected in any suitable manner, as for example, through a driving wheel member in the form of a sprocket 85 keyed to the shaft, as shown, and driven as by means of a chain 87 (FIGS. 2 and 5) which is trained over a driving sprocket 88 of suitable differential diameter mounted on the shaft of a motor 89 which may also be drivingly connected as by means of a chain 90 with an auxiliary driving transmission unit 91, and all suitably carried by the machine frame 21. These same driving means may operate to drive all of the other active components of the machine in synchronized relation. Thus, the infeed delivery conveyor 22 may be driven through means such as a sprocket 92. Synchronized driving of the infeed screw 24 is effected by means such as a sprocket wheel 93 (FIGS. 1, 2, 4 and 5) corotative on the cogwheel shaft 35, driving a chain 94 which drives a differential sprocket 95 of a gear train 97 by which the screw is rotatively driven. Driving of the discharge conveyors 77 may be effected similarly as the infeed conveyor 22. If preferred, of course, the conveyors 22 and 77 may be driven by means outside of the machine unit. Electrical power for the motor 89 may be provided from any preferred connection with an electrical supply line. Suitable electrical switch control (not shown) for the motor 89 may be located at any convenient place on the machine frame 21.

In order to enable the machine to process containers in a substantial range of diameters, means are provided for readily adjusting the container handling means, including the feed screw 24, the several transport conveyor chain sprocket assemblies, the crossover track bar assemblies and the return run means for the conveyor chain 20 simultaneously. For this purpose, the feed screw 24 and its driving gear transmission 97 are mounted on a bracket structure including a vertical plane longitudinally elongated mounting plate 98 which is supported in suspended relation by a pair of spaced vertical bars 99 having their upper end portions rigidly secured to a rigid head bar 100 (FIGS. 1, 2 and 5) provided with rigid spaced, parallel axis bearing hubs 101 slidably engaged on respective guide rods 102 fixedly supported at their opposite end portions on the top of the machine frame 21. Through this arrangement substantially micrometer optimum adjustments of the feed screw 24 toward and away from the guide bar 27 to accommodate various sizes of container to be fed are adapted to be made by manipulation of an adjustment screw 103 which is mounted rotatably in a bearing block 104 on the adjacent upper side portion of the machine frame 21 and has its threaded shank engaged through a threaded adjustment boss 105 rigid with the head bar 100, such that by manipulating a wrench-faced head 107 on the outer end of the screw the feed screw bracket can be adjusted inwardly or outwardly as required. Concurrent adjustment of the guide bar 33 is effected by virtue of its being supported by a bracket bar 108 which is mounted on the head bar 100 of the feed screw bracket structure.

Simultaneous container-size adjustments are effected with respect to the driven and idler transporting conveyor chain sprocket wheels and the crossover track bars by means comprising a longitudinally extending adjustment bar 109 which is transversely slidably supported on the driven shaft 58 and on a pair of spaced parallel supporting rods 110 which are suitably mounted fixedly on and across the top of the machine frame 21 respectively adjacent to the sets of sprocket wheel assemblies. In addition, the rods 110 provide support for the crossover track bars 62 and 69 for the conveyor chain 19 in a nonadjustable relation, through the medium of respective connecting bracket block members 111 which are secured fixedly to the bars and to the rods 110. Additional support for the bar 109 is provided by respective rods 112 which are mounted in adjacent parallel spaced relation to the rods 110 on the machine frame, but are slidably adjustable along their length so as to effect adjustments of the crossover track bars 63 and 70 which are mounted thereon through the medium of respective bracket blocks 113 fixedly attached to the respective track bars and the adjustable rods. Each of the rods 112 is fixedly attached to the bar 109 which for this purpose may be provided with respective hub bosses 114 through which the rods extend and to which the rods are attached as by means of set screws. Through this arrangement movement of the adjustment bar 109 inwardly or outwardly along the shaft 58 and the supporting rods 110 effects adjustment in the width of the crossover tracks for adjustments in the spacing of the transport conveyors to accommodate various sizes of containers.

Substantially micrometer adjustments of the bar 109 inwardly and outwardly are effected by means comprising an adjustment screw 114 journalled in a bearing pillow block 115 on the adjacent side frame bar of the machine frame and having its shank threaded through a boss 117 rigid on the bar 109 such that when the screw is rotatably manipulated through a wrench-faced head 118 on its outer end the bar 109 is adjusted as desired along the rods 110.

Simultaneous adjustments in the spacing between the sprocket wheels of the several sprocket assemblies is effected through the bar 109 which is coupled for this purpose with all of the sprocket wheels 57 and 65 so that these sprocket wheels and the crossover track bars are in constant registration in all adjustments to accommodate different diameters of containers. In a desirable form, means for coupling the adjustment bar 109 to the driven sprocket wheel member 57 comprise a yoke 119 fixed on the bar 109 and engaging in an annular groove 120 (FIGS. 5 and 6) in the hub 82 of the sprocket wheel 57 of the sprocket wheel assembly 54. Thereby free corotation of the hub 82 with the shaft 58 is permitted, but adjustment of the sprocket wheel 57 axially along the shaft 58 in the adjustment movements of the adjusting bar 109 is freely effected. All of the remaining sprocket wheels 57 are coupled to the first sprocket wheel 57 by means comprising a pair of tie rods 121 which extend through respective bearing bosses 122 provided by all of the hubs 82 of all of the sprocket wheels 55 and 57, being locked to the bosses 122 of the sprocket wheels 57 as by means of set screws 123 and extending freely slidably through the bosses 122 of the sprocket wheels 55. Additional locking means in respect to the sprocket wheels 57 comprise collars 124 also secured by set screws 125.

In similar fashion, all of the sprocket wheels 65 are coupled to the adjustment bar 109 by means of a yoke 127 rigid on the bar 109 and engaging in an annular groove 128 in an extension hub 129 which is freely slidable along the idler shaft 68 and has a coupling flange 130 to which are secured the end portions of coupling tie rods 131 which extend through all of the being secured fixedly to the sprockets 65 in substantially being secured fixedly to the syrockets 65 in substantially the same manner as the rods 121 are secured to the sprocket wheels 57, and extending freely slidably through the sprocket wheels 67. As a result, in or out adjustment movements of the adjustment bar 109 are reflected equally and simultaneously in spacing adjustments in all of the sprocket wheel assemblies and in the crossover tracks.

Simultaneous adjustments if the return run of the chain conveyor 20 with the sprocket wheel and crossover track adjustments are effected by having the cogwheels 34 and 81 mounted on the bar 109 through journalling of their shafts in bearings supported by a plate or bar 132 fixedly attached to and carried by the adjustment bar 109 as by means of vertical connecting bars 133 and 134.

Synchronization in adjustment of the infeed screw 24 and the sprocket wheel assemblies and the crossover tracks is attained by rotatably coupling the adjustment screws 103 and 114, as by means of a sprocket chain 135 trained over respective sprockets 137 and 138 fixedly on the screws. Thereby, upon effecting adjustments by means of either of the screws, the sprocket chain 135 effects the same adjustment in respect to the other of the screws and all of the adjustments are synchronized.

As shown in FIG. 5, the crossover track bars 62, 63 and 69, 70 may be substantially straight throughout their major extent, with suitable angular-lead-in and lead-out end portions oriented with respect to the associated sprocket wheels to afford smooth transition of the chain conveyors 19 and 20 to and from the crossover tracks. It is desirable, in order to minimize the angularity of the lead-in and lead-out flange terminals of the track bars, at both ends of each of the crossover tracks, to have intermediate transitional bends in the tracks as represented in FIG. 10. For illustrative purposes, a section of one of the crossover tracks 69, 70 has been chosen, but the same general arrangement will be present at the tops of the tracks 62, 63, while the bends will be reversed at the lower portions of the several tracks. In the representative example shown, the track bar 70 is provided adjacent to its upper terminal where the conveyor chains lead out onto the associated sprocket wheel assembly with a curve or bend 139 therein and the track bar 69 has a complementary curve or bend 140 therein. In order to facilitate movement of the tensioned conveyor 20 about the bend 139 with minimum frictional resistance, a relief recess is desirably provided in the conveyor-opposing face of the bar 70. On the other hand, in order to avoid drawing in of the tensioned conveyor 19 from within the bend 140 in the track bar 69, curved guide means are preferably provided comprising a generally U-shaped bracket 142 secured as by means of screws 143 to the outer side of the bar 69 at the bend 140 and carrying suitable longitudinally angular elongated guide bars 144 which engage guidingly in the grooves 60 of the chain link sections 39. This retains the chain 20, or the chain 19, as the case may be, in running relation to the track bar, and more particularly against being drawn by chain tension inwardly away from a track rib 145 carried by the crossover track bar and affording vertical support for the conveyor chain by engaging within the longitudinal back groove 53 in the chain. It will be understood that the rib structure 145 is carried by all of the crossover track bars 62, 63 and 69, 70. Where the crossover track bar has the curve relief recess 141 the vertical support rib 145 runs uninterruptedly along the curvature and bridges the recess, so that there is continuous vertical support at both sides of the crossover track for the respective chain conveyors 19 and 20.

Inasmuch as the chain conveyors 19 and 20 travel at the same synchronized speed, there is necessarily a certain degree of lag and return in the transverse alignment of the container gripping finger cradle members 28 of the conveyor chain 19 and the container gripping pads 38 of the conveyor chain 20 as the synchronized chains move onto and off of and around the bends in the crossover tracks. This results in corresponding relative shifting of the containers 15. Since the cradle members 28 retain the containers against escape therefrom in a direction longitudinally of the conveyor, means are provided for permitting the necessary shifting of the containers longitudinally along the conveyor chain 20 while nevertheless maintaining a firm grip on the containers against escape from the conveyor assembly even though operating at relatively high speed such, for example, as on the order of 500 to 600 containers through the machine per minute. For this purpose, each of the link sections 39 of the chain conveyor 20 has, in addition to the container-gripping pad 38 normally transversely aligned with a companion cradle 28 on the conveyor chain 19, respective fill-in or auxiliary container gripping pads 147 (FIGS. 8 and 10) on the link members 41 of the conveyor 20 and more particularly on head flanges 148 thereof defining the inner sides of the respective grooves 60. For this purpose, the pads 147 are desirably of the same frictional sponge material as the pads 38, and have socketed faces in which the respective flanges 148 are complementally received and to which the pads are suitably bonded in a manner to avoid displacement from the supporting flange. Through this arrangement, as the conveyor chains move through the bends 139, 140 the respective containers readily accommodate to the relative shifting relationship of the conveyor sections by turning slidably in the respective cradles 28 and rolling along the gripping pads, from the associated gripping pad 38 onto the adjacent auxiliary pad 147 at one side of the pad 38 and then at the upper bend in the track rolling back from the pad 147 onto the pad 38 substantially as indicated, by way of example by the directional arrow on the container 15 within the bend in FIG. 10. Since the pads 38 and 147 are relatively close together, of substantial thickness and high coefficient of friction, while the cradle members 28 have a low coefficient of friction relative to the containers, and the containers are at all times engaged along a substantial area both longitudinally and circumferentially, the containers are held positively against escape from the transporting conveyors assembly while in the rolling adjustment movement, as well as during all of the remainder of the multiconfigurated path of travel with the transporting conveyors.

After the containers 15 have been centrifugally spun free of any loose foreign material therein during passage around the idler sprocket wheel assembly 64, they are desirably subjected, while transported over the remaining driven and idler sprocket wheel assemblies, to cleansing treatment which may involve any or a plurality of air jet or blast, chemical spraying or washing, rinsing and the like, with spin-out of dislodged material or liquid following the fluid treatment. For this purpose, means are provided in association with certain of the driven sprocket wheel assemblies on the driven shaft 58 for effecting fluid treatment. For example, on being carried around the sprocket wheel assemblies 71 with their open or neck ends inwardly, the containers 15 may be subjected to a first fluid treatment which may be air or a chemical wash by means of streams 149 (FIGS. 5, 6 and 7) of the fluid directed from respective nozzles 150 radiating from the perimeter of a circular chambered distributor 151 attached concentrically about the shaft 58 to the fixed sprocket wheel 55 as by means of screws 152 and located between the sprocket wheels 55 and 57. The arrangement is such that as the containers 15 are delivered to the sprocket wheel assembly 71 the cleaning streams 149 impinge the neck and outside surfaces of the containers, and then as the containers assume radial orientation on and between the sprocket wheels 55 and 57, the openings into the containers align with the nozzles 150 so that the streams 149 are directed into the containers. Where the streams 149 are air, loose material and dust on and within the containers is loosened and blown off or out and if not blown out at least sufficiently loosened so that in a subsequent spin-out the loosened material will discharge.

In a desirable construction, the fluid distributor has an annular internal chamber 153 with which the nozzles 150 communicate by means of the respective passages 154 for equal pressure distribution of fluid from within the chamber 153 to and from the nozzles. As shown, there is a nozzle 150 for each sprocket of the sprocket wheels and thus for each position on the sprocket wheels assumed by the respective containers as carried around the sprocket wheel assembly. Cleaning fluid from a suitable source is supplied to the chamber 153 in suitable manner as, for example, by being introduced thereinto by way of a passage 155 to which is connected a conduit 157 connected with an axial bore 158 which extends partway into the shaft 58 through its nearest end to receive fluid thereinto from a rotary coupling 159 connected to a supply pipe 160 leading from a blower or pump 161 (FIG. 2) driven by a suitable motor 162.

After leaving the sprocket wheel assembly 71, and traveling over and with the idler sprocket wheel assembly 72, the containers 15 are spun free of any loose material that may have been dislodged where air is the cleaning fluid, or of liquid material as where a chemical solution is employed as the cleaning fluid. Then, the containers are adapted to be rinsed on travel over and about the sprocket wheel assembly 73 where rinsing solution such as clean water is directed in the form of streams 149' in the same fashion as described in respect to the cleaning fluid streams 149, and to the same effect in that both the outsides and the insides of the containers are subjected to the water streams sprayed thereon. For standardization of structure, the rinsing streams 149' are produced by means in all essential respects the same as the means for producing the streams 149, and primed reference numerals identify the corresponding structure on the sprocket wheel 55 of the sprocket wheel assembly 73. In this instance the supply conduit 157' communicates with a concentric supply bore in the opposite end portion of the shaft 58. As will be noted in FIG. 6, suitable openings are provided in the several wheel members to enable passage of the respective conduits 157 and 157' from the bores 158 and 158', respectively, to the distributors 151 and 151'.

From the rinsing wheel assembly 73, the containers are then transported to and about the final idler sprocket wheel assembly 74 where rinse liquid is discharged by centrifugal spinning, and the cleaned containers are then returned by means of the final sprocket wheel assembly 75 on the driven shaft to an upright position and released to the take-off or discharge conveyor 77, thus completing the cleaning cycle.

In order to contain the various cleaning fluids and material discharged from the containers against dispersion beyond the confines of the cleaning machine, suitable covering and shroud means 163 (FIGS. 1 and 2) are provided about the several sprocket wheel assemblies and suitable cover means 164 are provided over the crossover track system. Further, foreign matter and cleaning fluid are collected in a pan or trough 165 underlying the driven sprocket wheel assemblies 71 and 73 and provided at one end portion, herein the feedin end portion, with a sump 167 from which the collected liquid may be drained off to sewer or recirculated, as preferred. Within the collecting pan or tank 165 and the sump 167 or at suitable places therein, screens 168 may be provided to collect foreign material.

Means are provided for leveling the machine and for adjusting the height of the machine for preferred working conditions. For this purpose, the bottom of the frame 21 is provided at the four corners of the machine with vertical leveling screws 169 (FIGS. 1 and 2) and having supporting foot pads 170 on their lower ends. On their upper ends, the leveling screws 169 are desirably equipped to receive a wrench or a crank handle 171. Since it may be desirable after leveling has been effected to raise or lower the machine from time to time, means are provided to operate all of the leveling screws 169 simultaneously from and by manipulation of any one of the leveling screws. This is accomplished by means of a sprocket chain 172 which is trained over and about respective sprockets 173 mounted on the lower end portions of the leveling screws 169. Each of the sprockets 173 has a split clamping hub 174 which, after leveling has been effected is secured corotatively with the associated leveling screw 169 by tightening a bolt 175. Through this arrangement each of the leveling screws is adapted to be operated independently until leveling of the machine has been effected and then by clamping the hubs 174 to the respective screws, all of the screws will rotate simultaneously upon rotation on any one of the screws to raise or lower the entire machine in a level condition.

It will be understood that variations and modifications may be effected without departing from the spirit and scope of the novel concepts of this invention.

I claim as my invention:

1. In an apparatus for cleaning bottle and jar type containers having closed bottoms and open ends:
   endless flexible conveyor means operative to engage and transport the containers in a given path; and
   means for guiding the endless conveyor means continuously through a plurality of loops oriented in a generally figure-eight pattern in said path, in one of which loops the containers have their open ends outwardly of the loop and in another of which loops the containers have their open ends inwardly of the loop.

2. In apparatus according to claim 1, means for driving the conveyor means at a speed which moves the containers in said one loop sufficiently fast to effect centrigual ejection of loose materials from within the containers.

3. In apparatus according to claim 1, said loops being on respective horizontal axis and said guiding means operating to guide the conveyor means to carry the containers up over and about said one loop and then up and over and about the other of said loops.

4. In apparatus according to claim 1, said one loop succeeding the other of the loops in said path, and means for subjecting the containers to cleaning fluid from within said other loop, and the containers being then centrifugally evacuated while transported through said one loop.

5. Apparatus according to claim 1, including additional means for guiding the conveyor means in endless continuity through further loops oriented in generally figure-eight pattern in said path.

6. In apparatus according to claim 1, said means for guiding the conveyor means comprising a plurality of sets of sprocket wheels corotative with one shaft, a plurality of sets of sprocket wheels corotative with another shaft, means for driving one of said shafts, said conveyor means comprising a pair of endless articulated complementary chain conveyors, each set of sprocket wheels comprising a pair of sprocket wheels, means for guiding one of the conveyors to travel in meshing relation with one of the sprocket wheels of each set in said figure-eight orientation about said shaft, means for guiding the other of said conveyors in the figure-eight orientation in meshing relation with the other of the sprocket wheels of said sets and about said shafts, said sets of sprocket wheels on the respective shafts being offset with relation to each other in generally staggered relation and said conveyors crossing over and under one another in traveling between said sets of sprocket wheels.

7. In apparatus according to claim 6, means for guiding said conveyors between a feedin station at one end of said path and a discharge station at the opposite end of said path, means for feeding successive containers to said conveyors at said feedin station, and means for simultaneously adjusting said feedin means and said sprocket wheels to vary the spacing of said conveyors to accommodate containers of different diameters.

8. Apparatus according to claim 7, comprising crossover track bars between and guiding said conveyors from and to said sprocket wheels, and means for adjusting the spacing between said crossover track bars simultaneously with the adjustments of said feedin means and said sprockets.

9. In apparatus according to claim 1, said conveyor means comprising a pair of articulated complementary chain conveyors, such guiding means comprising a pair of spaced corotative sprocket wheels over which the conveyors are respectively meshed, and means carried by one of said sprocket wheels between the wheels for fluid treatment of the containers.

10. In apparatus according to claim 9, a shaft, said sprocket wheels being mounted corotatively on said shaft, and means for supplying said fluid treating means with fluid comprising a duct bore in said shaft.

11. In an apparatus for cleaning bottle and jar type containers having closed bottoms and open ends:
   endless flexible conveyor means operative to engage and transport the containers in a given path; and
   means for guiding the endless conveyor means continuously through a plurality of loops in said path, in one of which loops the containers have their open ends outwardly of the loop and in another of which loops the containers have their open ends inwardly of the loop;
   said conveyor means comprising a pair of endless articulated complementary chain conveyors operative to engage the containers therebetween;
   said guiding means comprising respective pairs of spaced sprocket wheels over which the conveyors run and which define said loops in said path.

12. In apparatus according to claim 11, means for adjusting the spacing between the sprocket wheels of the respective pairs to adjust the spacing of the conveyors for accommodating various diameters of containers.

13. Apparatus according to claim 12, including guide bars leading the conveyors between the sprocket wheels of said sets, and means for adjusting spacing between the guide bars simultaneously with adjustment of the spacing between the sprocket wheels.

14. In an apparatus for cleaning bottle and jar type containers having closed bottoms and open ends:
   endless flexible conveyor means operative to engage and transport the containers in a given path; and
   means for guiding the endless conveyor means continuously through a plurality of loops in said path;
   said conveyor means comprising a pair of complementary chain conveyors;
   one of said conveyors having saddle gripping members in which the containers are engaged; and the other of said conveyors having frictional sponge rubber pads normally aligned with said saddle members in complementary relation to grip the opposite side of the container to hold it in the saddle member in each instance.

15. In apparatus according to claim 14, said conveyors being subject to relative shifting in traveling said path, said other conveyor having auxiliary sponge rubber pads thereon between the pads which are normally complementary to said saddle members and engageable with the containers in the course of said shifting.

16. In a method of cleaning bottle and jar type containers having closed bottoms and opposite open ends:
moving the containers in a cleaning path comprising a plurality of loops in a generally figure-eight configuration;
in one of said loops moving said containers with their open ends outwardly of the loop; and
in another of said loops moving said containers with their open ends inwardly of the loop.

17. A method according to claim 16, comprising spinning the containers in and about said one loop, in which their ends are outwardly of the loop, to discharge foreign materials from within the containers.

18. In a method according to claim 16, directing cleaning streams into the open ends of the containers while they are moving around the loop with their open ends inwardly, and spinning out material from within the containers in movement around the loop with their open ends outwardly.

19. In a method according to claim 18, directing streams of cleaning fluid onto the outer surfaces of the containers while in transitional movement with respect to said loop in which the open ends of the containers are directed inwardly.

20. In an articulated conveyor structure of the character described:
chain link sections each comprising a pair of members;
means pivotally connecting one end portion of one of said members to an end portion of the second of said members;
the respective remaining end portions of said members having means thereon for respective articulated connection to other sections of the conveyor structure;
flange means on said one member on said one end portion thereof and clear of said second member adapted to have mounted thereon means for engaging an article; and
flange structure on the remaining end portion of said second member generally aligned with but clear of said flange means on said one member and adapted to have mounted thereon means for engaging an article.

21. Structure according to claim 20, comprising self-contained cradle means attached to said flange means on said one member and adapted to grip a container peripherally.

22. Structure according to claim 20, comprising respective frictional resiliently yieldable gripping and cushioning pads of substantial thickness mounted on said flange means and on said flange structure.

23. Structure according to claim 20, one of said members having a cog hub on its end portion which is pivotally connected to the other of said members, said members having a longitudinal guide bar receiving groove along the back thereof and in part defined by said cog hub, said flange structure on said second member providing a sprocket hub and defining part of a groove along both opposite sides of said second member.

24. In an apparatus for cleaning bottle and jar type containers having closed bottoms and open ends:
endless flexible conveyor means operative to engage and transport the containers in a given path;
means for guiding the endless conveyor means continuously through a plurality of loops in said path, in one of which loops the containers have their open ends outwardly of the loop and in another of which loops the containers have their open ends inwardly of the loop;
said conveyor means comprising complementary endless chain articulated conveyors;
means guiding said conveyors to converge into container engaging relation at a beginning point in said path; and
means for guiding said conveyors to separate at a terminal point in said path and to return to said beginning point.

25. In apparatus according to claim 24, said means for guiding the conveyors in the multi-loop path maintaining said loops on spaced horizontal axes in a plane which is offset from a horizontal plane in which said conveyor converging guiding means and said conveyor separating guiding means operate.

26. In apparatus according to claim 25, said loop guiding means comprising sprocket wheels, said conveyors having sprocket hubs engaged by said sprocket wheels, said conveyor converging and separating guiding means comprising cogwheels, and said conveyors having cog hubs engaged by said cogwheels.

27. In apparatus according to claim 26, bar guide means extending between the sprocket wheels, and said conveyors having longitudinal grooves in which said bars engage guidingly.

28. In an apparatus for cleaning bottle and jar type containers having closed bottoms and open ends:
endless flexible conveyor means operative to engage and transport the containers in a given path;
means on said frame structure for guiding the endless conveyor means continuously through a plurality of loops in said path;
means for supporting said frame structure on a floor and including means operative to effect independently frame raising and lowering leveling adjustments relative to the floor at a plurality of points; and
means for coupling said leveling adjustments to operate in unison to raise and lower the frame.

References Cited

UNITED STATES PATENTS

| | | | |
|---|---|---|---|
| 1,843,996 | 2/1932 | Thompson | 198—22 |
| 2,578,733 | 12/1951 | Nordquist | 198—33X(R4) |
| 2,879,882 | 3/1959 | Whelan | 198—33(R4) |
| 2,710,818 | 6/1955 | Winters | 134—23X |
| 3,317,030 | 5/1967 | Davis | 198—189 |
| 3,108,682 | 10/1963 | Zipper | 198—162 |

EDWARD SROKA, Primary Examiner

U.S. Cl. X.R.

134—33; 198—33, 162

UNITED STATES PATENT OFFICE
CERTIFICATE OF CORRECTION

Patent No. 3,556,847                    Dated January 19, 1971

Inventor(s) Donald T. Prodzenski

It is certified that error appears in the above-identified paten and that said Letters Patent are hereby corrected as shown below:

Col. 8, line 24 should read --sprocket wheels 65 and 67 adjacent to their hubs 82, --; line 25 for "syrockets" read --sprock line 32 for "if" read --of--.

Signed and sealed this 25th day of January 1972.

(SEAL)
Attest:

EDWARD M.FLETCHER, JR.            ROBERT GOTTSCHALK
Attesting Officer                 Commissioner of Patents